United States Patent
Holliday et al.

(10) Patent No.: US 10,491,146 B2
(45) Date of Patent: Nov. 26, 2019

(54) SYSTEM AND METHOD FOR COMPENSATING FOR GENERATOR-INDUCED FLICKER IN A WIND TURBINE

(71) Applicant: General Electric Company, Schenectady, NY (US)

(72) Inventors: Cornelius Edward Holliday, Forest, VA (US); David Smith, Daleville, VA (US)

(73) Assignee: General Electric Company, Schenectady, NY (US)

(*) Notice: Subject to any disclaimer, the term of this patent is extended or adjusted under 35 U.S.C. 154(b) by 27 days.

(21) Appl. No.: 15/941,352

(22) Filed: Mar. 30, 2018

(65) Prior Publication Data

US 2019/0305703 A1    Oct. 3, 2019

(51) Int. Cl.
| | |
|---|---|
| *H02P 9/02* | (2006.01) |
| *H02K 7/18* | (2006.01) |
| *F03D 9/25* | (2016.01) |
| *F03D 17/00* | (2016.01) |
| *F03D 7/02* | (2006.01) |
| *H02M 5/458* | (2006.01) |
| *H02P 101/15* | (2016.01) |

(52) U.S. Cl.
CPC .............. *H02P 9/02* (2013.01); *F03D 7/0272* (2013.01); *F03D 9/255* (2017.02); *F03D 17/00* (2016.05); *H02K 7/183* (2013.01); *H02M 5/458* (2013.01); *H02P 2101/15* (2015.01)

(58) Field of Classification Search
CPC ...... H02P 9/02; H02P 2101/15; H02M 5/458; H02K 7/183; F03D 7/0272; F03D 9/255; F03D 17/00
See application file for complete search history.

(56) References Cited

U.S. PATENT DOCUMENTS

| | | |
|---|---|---|
| 3,754,184 A | 8/1973 | Stone |
| 4,234,842 A | 11/1980 | Brennen et al. |
| (Continued) | | |

FOREIGN PATENT DOCUMENTS

| | | |
|---|---|---|
| EP | 1 508 951 A1 | 2/2005 |
| EP | 3 068 007 A1 | 9/2016 |
| WO | WO 01/73518 A1 | 4/2001 |

OTHER PUBLICATIONS

Extended European Search Report, dated Aug. 8, 2019.

*Primary Examiner* — Emily P Pham
(74) *Attorney, Agent, or Firm* — Dority & Manning, P.A.

(57) ABSTRACT

A method for compensating for flicker induced by a generator connected to a power grid includes determining, via a controller of the wind turbine, a nominal reactive current command for a rotor of the generator. The method also includes measuring, via at least sensor, one or more operational parameters of at least one of the generator or the power grid. Further, the method includes determining, via a flicker compensation device, a flicker compensation parameter as a function of the one or more operational parameters. Moreover, the method includes determining, via the controller, a net reactive current command for the rotor as a function of the flicker compensation parameter and the nominal reactive current command. In addition, the method includes controlling, via the controller, the rotor of the generator based on the net reactive current command.

20 Claims, 6 Drawing Sheets

(56) References Cited

U.S. PATENT DOCUMENTS

| | | | | |
|---|---|---|---|---|
| 6,670,721 | B2* | 12/2003 | Lof | H02J 3/381 |
| | | | | 290/44 |
| 9,459,294 | B2* | 10/2016 | Cheng | G01R 21/00 |
| 9,509,145 | B2* | 11/2016 | Kanao | F03D 7/0292 |
| | | | | 290/44 |
| 2007/0273155 | A1* | 11/2007 | Barton | H02J 3/1892 |
| | | | | 290/44 |
| 2010/0133831 | A1* | 6/2010 | Scholte-Wassink | |
| | | | | F03D 7/0292 |
| | | | | 290/44 |
| 2018/0323620 | A1* | 11/2018 | Ganireddy | H02J 3/1892 |
| | | | | 290/44 |

* cited by examiner

SYSTEM AND METHOD FOR COMPENSATING FOR GENERATOR-INDUCED FLICKER IN A WIND TURBINE

FIELD

The present disclosure relates generally to wind turbines and, more particularly, to a system and method for compensating for generator-induced flicker in wind turbines connected to a power grid.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

In many wind turbines, the generator may be electrically coupled to a bi-directional power converter that includes a rotor-side converter joined to a line-side converter via a regulated DC link. Such wind turbine power systems are generally referred to as a doubly-fed induction generator (DFIG). DFIG operation is typically characterized in that the rotor circuit is supplied with current from a current-regulated power converter. As such, the wind turbine produces variable mechanical torque due to variable wind speeds and the power converter ensures this torque is converted into an electrical output at the same frequency of the grid.

During operation, wind impacts the rotor blades and the blades transform wind energy into a mechanical rotational torque that drives a low-speed shaft. The low-speed shaft is configured to drive the gearbox that subsequently steps up the low rotational speed of the low-speed shaft to drive a high-speed shaft at an increased rotational speed. The high-speed shaft is generally coupled to the generator so as to rotatably drive a generator rotor. As such, a rotating magnetic field may be induced by the generator rotor and a voltage may be induced within a generator stator. Rotational energy is converted into electrical energy through electromagnetic fields coupling the rotor and the stator, which is supplied to a power grid via a grid breaker. Thus, the main transformer steps up the voltage amplitude of the electrical power such that the transformed electrical power may be further transmitted to the power grid.

Wind turbines that utilize DFIGs can produce flicker due to design and/or manufacturing variations. More specifically, as the generator rotates, differences in poles and/or one or more phases can cause variations in the stator reactive current. At certain speeds, the variations can be of a frequency in the range defined as flicker. The term "flicker," as described herein, generally refers to variations in current or voltage that are perceptible at certain frequencies (e.g. from about 1 Hertz (Hz) to about 30 Hz). Flicker may also be caused by radial variations in the air gap of the generator, for instance due to saliency in the rotor design and/or construction. As used herein, a salient pole-type of rotor has of large number of projected poles (often referred to as salient poles) mounted on a magnetic wheel, in contrast to non-salient pole rotors that have a cylindrical shape with parallel slots thereon to place rotor windings. Oftentimes, grid requirements prohibit connection to the power grid if flicker is present in a certain amount.

Thus, the present disclosure is directed to a system and method for compensating for generator-induced flicker in wind turbines connected to the power grid so as to address the aforementioned issues.

BRIEF DESCRIPTION

Aspects and advantages of the invention will be set forth in part in the following description, or may be obvious from the description, or may be learned through practice of the invention.

In one aspect, the present disclosure is directed to a method for compensating for flicker induced by a generator connected to a power grid. The method includes determining, via a controller of the wind turbine, a nominal reactive current command for a rotor of the generator. The method also includes measuring, via at least sensor, one or more operational parameters of at least one of the generator or the power grid. Further, the method includes determining, via a flicker compensation device, a flicker compensation parameter as a function of the one or more operational parameters. Moreover, the method includes determining, via the controller, a net reactive current command for the rotor as a function of the flicker compensation parameter and the nominal reactive current command. In addition, the method includes controlling, via the controller, the rotor of the generator based on the net reactive current command.

In one embodiment, the operational parameter(s) may include grid voltage, generator shaft speed, stator reactive current, a stator reactive power, or any other parameters of the generator and/or power grid. Thus, in certain embodiments, the step of determining, via the flicker compensation device, the flicker compensation parameter as a function of the one or more operational parameters may include determining a variation in the stator reactive current due to an imbalance or saliency of the rotor and determining the flicker compensation parameter as a function of the variation.

In further embodiments, the step of determining the variation in the stator reactive current due to the imbalance of the rotor may include determining a rotor speed of the rotor based on the generator shaft speed, determining a rotor position of the rotor based on the rotor speed, determining a slip position of the rotor based on the rotor position and a grid angle of the grid voltage, and multiplying the slip position by a number of poles of the generator to obtain a flicker position. For example, the flicker position may be representative of an angle difference between a stator flux position and the rotor position.

In additional embodiments, the step of determining the flicker compensation parameter as a function of the variation may include multiplying the flicker position by at least one of a sine function or a cosine function to obtain at least one first frequency output, multiplying the at least one first frequency output by a stator reactive current error to obtain at least one second frequency output, integrating the at least one second frequency output to obtain at least one third frequency output, and multiplying the at least one third frequency output by at least one of the sine function or the cosine function to obtain at least one fourth frequency output.

More specifically, in one embodiment, the step of determining the flicker compensation parameter as a function of the variation may include multiplying the flicker position by a sine function and a cosine function to obtain two first frequency outputs, multiplying each of the first frequency outputs by a stator reactive current error to obtain two second frequency outputs, integrating each of second frequency outputs to obtain two third frequency outputs, multiplying each of the third second frequency outputs by the sine function and the cosine function, respectively, to obtain two fourth frequency outputs, and summing the two fourth frequency outputs together to obtain a fifth frequency output to determine the flicker compensation parameter. In such embodiments, the method may also include applying a gain to the fifth frequency output to determine the flicker compensation parameter.

In another embodiment, the method may further include determining the grid angle as a function of the grid voltage. More specifically, in one embodiment, the step of determining the grid angle as a function of the grid voltage may include determining a grid frequency by processing the grid voltage via a phase locked loop and integrating the grid frequency to obtain the grid angle.

In another aspect, the present disclosure is directed to an electrical power system connected to a power grid. The electrical power system includes a generator having a rotor and a stator, at least one sensor for monitoring one or more operational parameters of at least one of the generator or the power grid, and a controller configured to control the electrical power system. The controller is configured to perform one or more operations, including but not limited to determining a nominal reactive current command for the rotor, determining a flicker compensation parameter as a function of the one or more operational parameters, determining a net reactive current command for the rotor as a function of the flicker compensation parameter and the nominal reactive current command, and controlling the rotor of the generator based on the net reactive current command. It should be understood that the electrical power system may further include any of the additional features as described herein.

In yet another aspect, the present disclosure is directed to a method for determining whether generator-induced flicker is present during operation of a generator of a wind turbine connected to a power grid. The method includes measuring, via at least sensor, a plurality of operational parameters of at least one of the generator or the power grid. More specifically, the plurality of operational parameters may include, at least, a grid voltage of the power grid and shaft speed of the generator. Thus, the method further includes determining, via a flicker compensation device communicatively coupled to a controller of the wind turbine, a flicker compensation parameter as a function of the plurality of operational parameters and determining whether flicker is present during operation of the generator based on the flicker compensation parameter. It should be understood that the method may further include any of the additional steps and/or features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
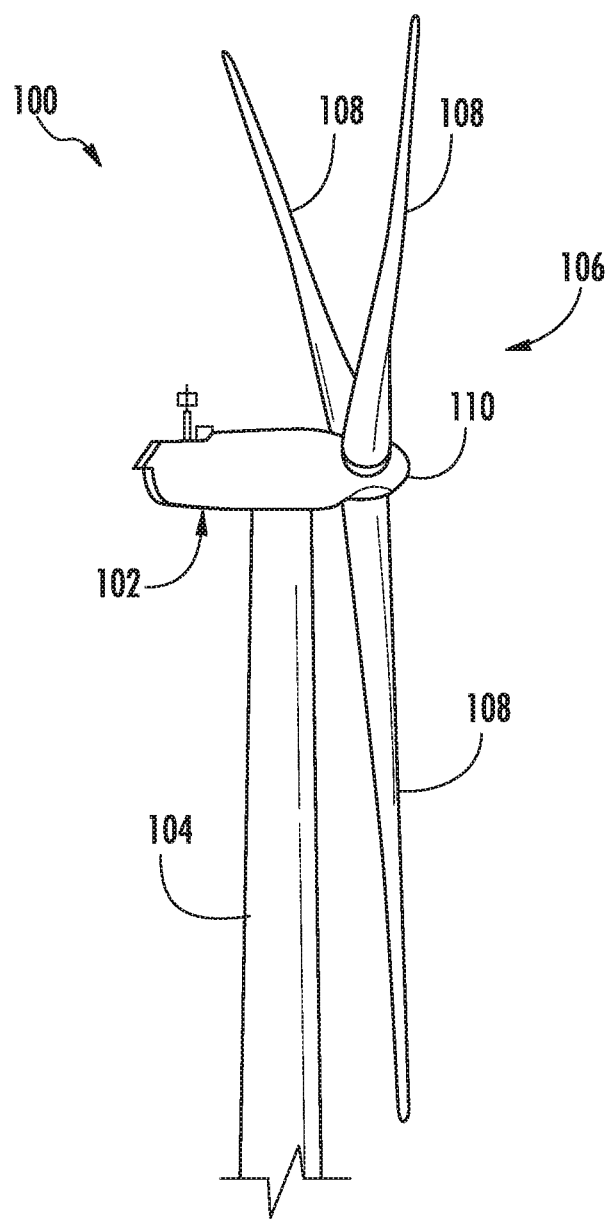
FIG. 1 illustrates a perspective view of a portion of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
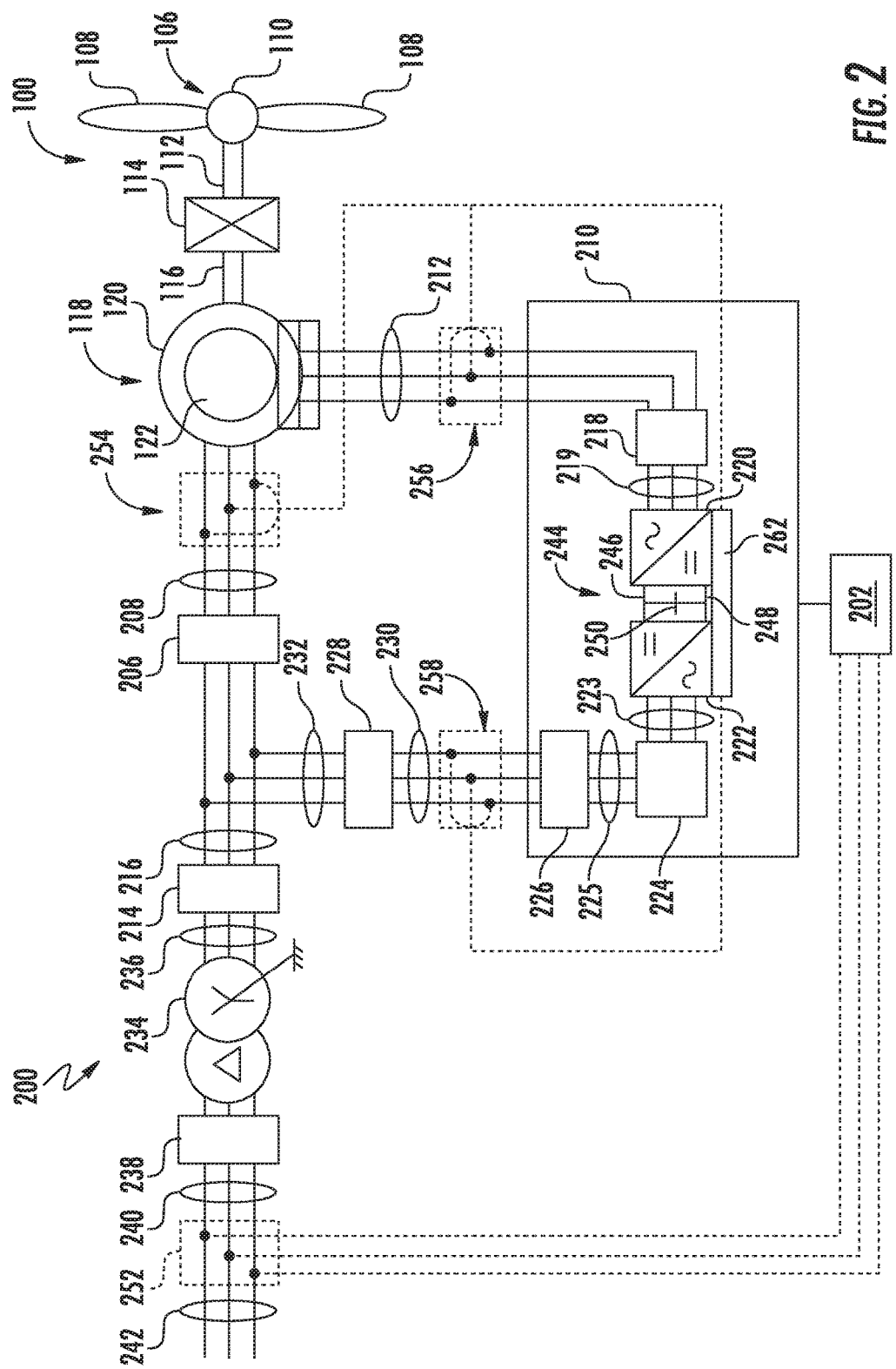
FIG. 2 illustrates a schematic view of one embodiment of an electrical power system suitable for use with the wind turbine shown in FIG. 1.

Referring now to the drawings, FIG. 1 illustrates a perspective view of a portion of one embodiment of a wind turbine 100 according to the present disclosure that is configured to implement the method as described herein. The wind turbine 100 includes a nacelle 102 that typically houses a generator 118 (FIG. 2). The nacelle 102 is mounted on a tower 104 having any suitable height that facilitates operation of wind turbine 100 as described herein. The wind turbine 100 also includes a rotor 106 that includes three blades 108 attached to a rotating hub 110. Alternatively, the wind turbine 100 may include any number of blades 108 that facilitates operation of the wind turbine 100 as described herein.

Referring now to FIG. 2, a schematic view of one embodiment of an electrical power system 200 that may be used with the wind turbine 100 is illustrated. During operation, wind impacts the blades 108 and the blades 108 transform wind energy into a mechanical rotational torque that rotatably drives a low-speed shaft 112 via the hub 110. The low-speed shaft 112 is configured to drive a gearbox 114 that subsequently steps up the low rotational speed of the low-speed shaft 112 to drive a high-speed shaft 116 at an increased rotational speed. The high-speed shaft 116 is generally rotatably coupled to a generator 118 so as to rotatably drive a generator rotor 122 having field winding (not shown). More specifically, in one embodiment, the generator 118 may be a wound rotor, three-phase, doubly-fed induction (asynchronous) generator (DFIG) that includes a generator stator 120 magnetically coupled to a generator rotor 122. As such, a rotating magnetic field may be induced by the generator rotor 122 and a voltage may be induced within a generator stator 120 that is magnetically coupled to the generator rotor 122. In such embodiments, the generator 118 is configured to convert the rotational mechanical energy to a sinusoidal, three-phase alternating current (AC) electrical energy signal in the generator stator 120. The associated electrical power can be transmitted to a main transformer 234 via a stator bus 208, a stator synchronizing switch 206, a system bus 216, a main transformer circuit breaker 214, and a generator-side bus 236. The main transformer 234 steps up the voltage amplitude of the electrical power such that the transformed electrical power may be further transmitted to a grid via a grid circuit breaker 238, a breaker-side bus 240, and a grid bus 242.

Figure 3:
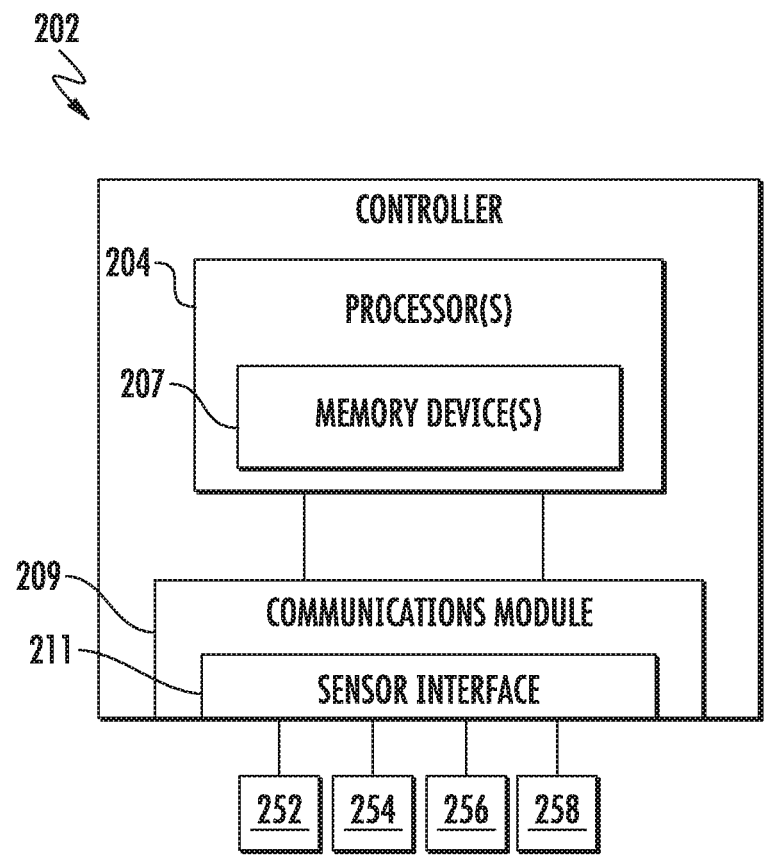
FIG. 3 illustrates a block diagram of one embodiment of a controller suitable for use with the wind turbine shown in FIG. 1.

In addition, the electrical power system 200 may include a wind turbine controller 202 configured to control any of the components of the wind turbine 100 and/or implement the method steps as described herein. For example, as shown particularly in FIG. 3, the controller 202 may include one or more processor(s) 204 and associated memory device(s) 207 configured to perform a variety of computer-implemented functions (e.g., performing the methods, steps, calculations and the like and storing relevant data as disclosed herein). Additionally, the controller 202 may also include a communications module 209 to facilitate communications between the controller 202 and the various components of the wind turbine 100, e.g. any of the components of FIG. 2. Further, the communications module 209 may include a sensor interface 211 (e.g., one or more analog-to-digital converters) to permit signals transmitted from one or more sensors to be converted into signals that can be understood and processed by the processors 204. It should be appreciated that the sensors (e.g. sensors 252, 254, 256, 258) may be communicatively coupled to the communications module 209 using any suitable means. For example, as shown in FIG. 3, the sensors 252, 254, 256, 258 may be coupled to the sensor interface 211 via a wired connection. However, in other embodiments, the sensors 252, 254, 256, 258 may be coupled to the sensor interface 211 via a wireless connection, such as by using any suitable wireless communications protocol known in the art. As such, the processor 204 may be configured to receive one or more signals from the sensors.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 204 is also configured to compute advanced control algorithms and communicate to a variety of Ethernet or serial-based protocols (Modbus, OPC, CAN, etc.). Additionally, the memory device(s) 207 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 207 may generally be configured to store suitable computer-readable instructions that, when implemented by the processor(s) 204, configure the controller 202 to perform the various functions as described herein.

Referring back to FIG. 2, the generator stator 120 may be electrically coupled to a stator synchronizing switch 206 via a stator bus 208. In one embodiment, the generator rotor 122 may be electrically coupled to a bi-directional power conversion assembly 210 or power converter via a rotor bus 212.

Alternatively, the generator rotor 122 may be electrically coupled to the rotor bus 212 via any other device that facilitates operation of electrical power system 200 as described herein. In a further embodiment, the stator synchronizing switch 206 may be electrically coupled to a main transformer circuit breaker 214 via a system bus 216.

The power conversion assembly 210 may include a rotor filter 218 that is electrically coupled to the generator rotor 122 via the rotor bus 212. In addition, the rotor filter 218 may include a rotor-side reactor. A rotor filter bus 219 electrically couples the rotor filter 218 to a rotor-side power converter 220. Further, the rotor-side power converter 220 may be electrically coupled to a line-side power converter 222 via a single direct current (DC) link 244. Alternatively, the rotor-side power converter 220 and the line-side power converter 222 may be electrically coupled via individual and separate DC links. In addition, as shown, the DC link 244 may include a positive rail 246, a negative rail 248, and at least one capacitor 250 coupled therebetween.

In addition, a line-side power converter bus 223 may electrically couple the line-side power converter 222 to a line filter 224. Also, a line bus 225 may electrically couple the line filter 224 to a line contactor 226. In addition, the line filter 224 may include a line-side reactor. Moreover, the line contactor 226 may be electrically coupled to a conversion circuit breaker 228 via a conversion circuit breaker bus 230. In addition, the conversion circuit breaker 228 may be electrically coupled to the main transformer circuit breaker 214 via system bus 216 and a connection bus 232. The main transformer circuit breaker 214 may be electrically coupled to an electric power main transformer 234 via a generator-side bus 236. The main transformer 234 may be electrically coupled to a grid circuit breaker 238 via a breaker-side bus 240. The grid circuit breaker 238 may be connected to the electric power transmission and distribution grid via a grid bus 242.

Figure 4:
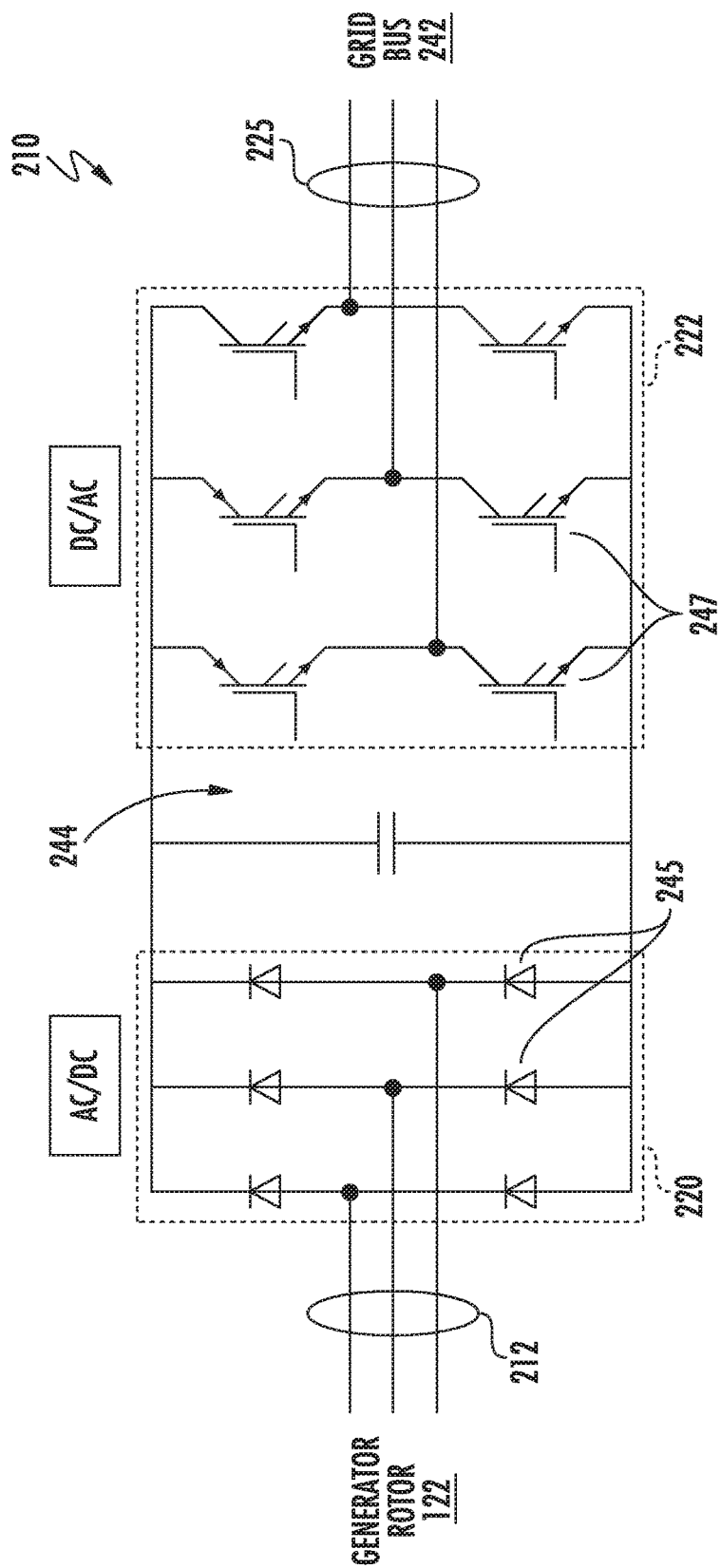
FIG. 4 illustrates a schematic diagram of one embodiment of a power converter of a wind turbine according to the present disclosure.

Referring particularly to FIGS. 2 and 4, alternating current (AC) power generated at the generator stator 120 by rotation of the rotor 106 is provided via a dual path to the grid bus 242. The dual paths are defined by the stator bus 208 and the rotor bus 212. On the rotor bus side 212, sinusoidal multi-phase (e.g. three-phase) AC power is provided to the power conversion assembly 210. The rotor-side power converter 220 converts the AC power provided from the rotor bus 212 into DC power and provides the DC power to the DC link 244. Switching elements 245 (e.g. diodes) used in bridge circuits of the rotor side power converter 220 can be modulated to convert the AC power provided from the rotor bus 212 into DC power suitable for the DC link 244.

The line side converter 222 converts the DC power on the DC link 244 into AC output power suitable for the electrical grid bus 242. In particular, switching elements 247 (e.g. IGBTs) used in bridge circuits of the line side power converter 222 can be modulated to convert the DC power on the DC link 244 into AC power on the line side bus 225. The AC power from the power conversion assembly 210 can be combined with the power from the stator 120 to provide multi-phase power (e.g. three-phase power) having a frequency maintained substantially at the frequency of the electrical grid bus 242 (e.g. 50 Hz/60 Hz).

It should be understood that the rotor-side power converter 220 and the line-side power converter 222 may have any configuration using any switching devices that facilitate operation of electrical power system 200 as described herein. For example, FIG. 4 illustrates a simplified schematic diagram of one embodiment of a variable frequency drive (VFD) that maintains a constant electrical frequency output on the grid side of the generator 118. As shown, the VFD configuration includes a six-switch voltage-sourced rectifier on the rotor side converter 220, a DC link capacitor 249 to minimize DC voltage variation, and a six-switch voltage-sourced inverter utilizing pulse width modulation on the grid side. Rotor-side switching elements 245 are often diodes or silicon controlled rectifiers (SCR), while the grid side-switching elements 247 are often insulated gate bipolar transistors (IGBTs). As such, the magnitude and electrical frequency of the current supplied to the generator rotor 122 through the VFD may be varied to account for changes in the rotor shaft speed and to maintain a constant output on the generator stator winding.

Further, the power conversion assembly 210 may be coupled in electronic data communication with the turbine controller 202 and/or a separate or integral converter controller 262 to control the operation of the rotor-side power converter 220 and the line-side power converter 222. For example, during operation, the controller 202 may be configured to receive one or more voltage and/or electric current measurement signals from the first set of voltage and electric current sensors 252. Thus, the controller 202 may be configured to monitor and control at least some of the operational variables associated with the wind turbine 100 via the sensors 252. In the illustrated embodiment, each of the sensors 252 may be electrically coupled to each one of the three phases of the power grid bus 242. Alternatively, the sensors 252 may be electrically coupled to any portion of electrical power system 200 that facilitates operation of electrical power system 200 as described herein. In addition to the sensors described above, the sensors may also include a second set of voltage and electric current sensors 254, a third set of voltage and electric current sensors 256, a fourth set of voltage and electric current sensors 258 (all shown in FIG. 2), and/or any other suitable sensors.

It should also be understood that any number or type of voltage and/or electric current sensors 252, 254, 256, 258 may be employed within the wind turbine 100 and at any location. For example, the sensors may be current transformers, shunt sensors, rogowski coils, Hall Effect current sensors, Micro Inertial Measurement Units (MIMUs), or similar, and/or any other suitable voltage or electric current sensors now known or later developed in the art.

Thus, the converter controller 262 is configured to receive one or more voltage and/or electric current feedback signals from the sensors 252, 254, 256, 258. More specifically, in certain embodiments, the current or voltage feedback signals may include at least one of line feedback signals, line-side converter feedback signals, rotor-side converter feedback signals, or stator feedback signals. For example, as shown in the illustrated embodiment, the converter controller 262 receives voltage and electric current measurement signals from the second set of voltage and electric current sensors 254 coupled in electronic data communication with stator bus 208. The converter controller 262 may also receive the third and fourth set of voltage and electric current measurement signals from the third and fourth set of voltage and electric current sensors 256, 258. In addition, the converter controller 262 may be configured with any of the features described herein in regards to the main controller 202. As such, the converter controller 262 is configured to implement the various method steps as described herein and may be configured similar to the turbine controller 202.

Figure 5:
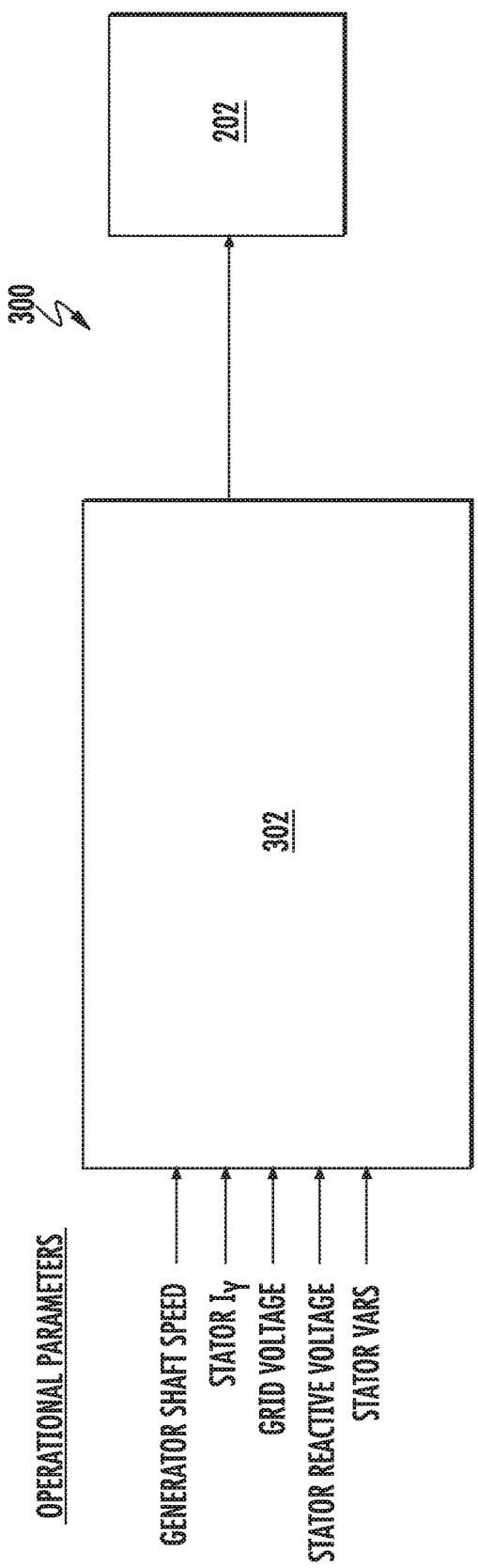
FIG. 5 illustrates a simplified, block diagram of one embodiment of a flicker compensation device for a generator of a wind turbine according to the present disclosure.
Figure 6:
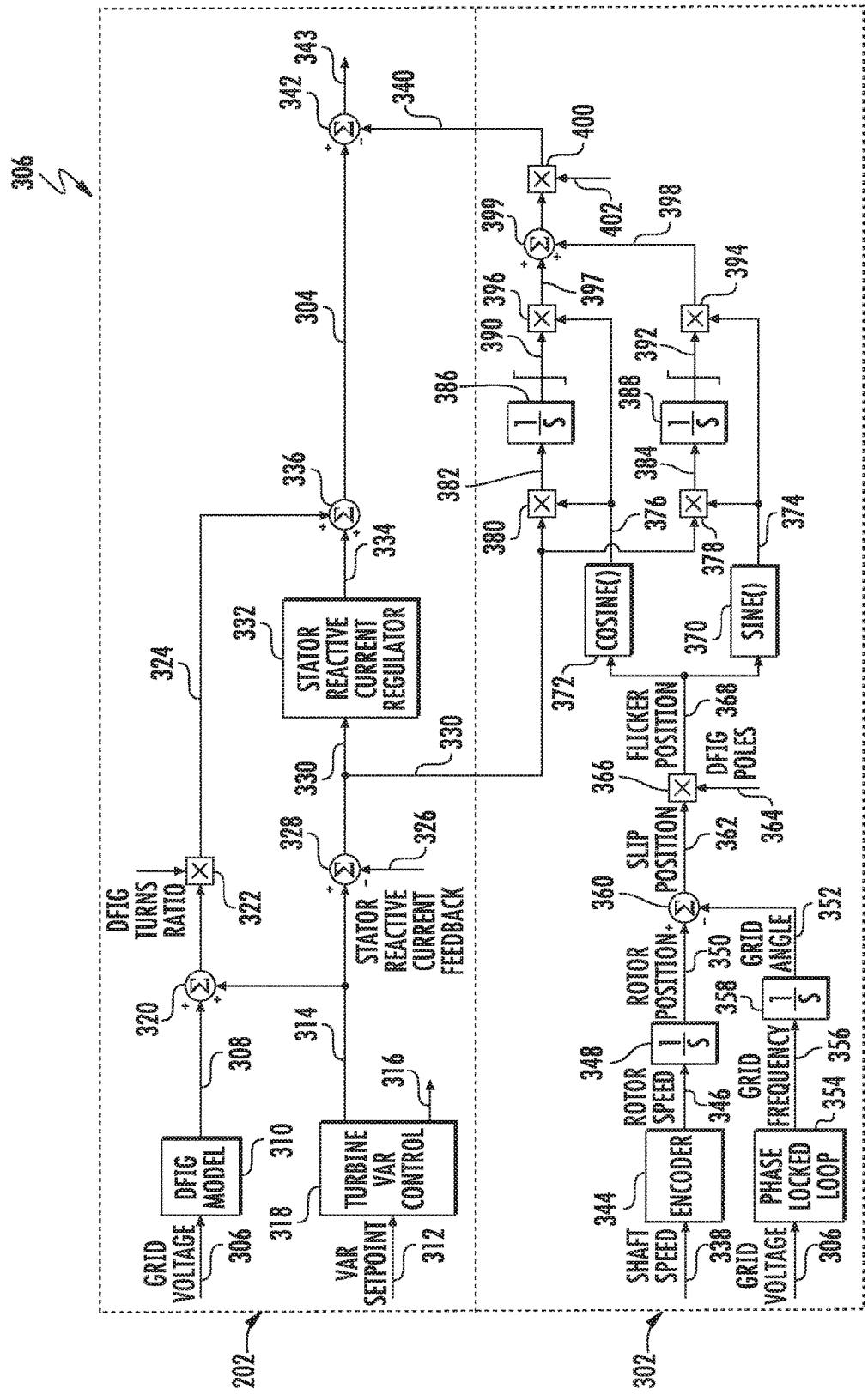
FIG. 6 illustrates a detailed, block diagram of one embodiment of a flicker compensation device for a generator of a wind turbine according to the present disclosure.

Referring now to FIGS. 5 and 6, various block diagrams are depicted to illustrate multiple components of a system 300 for compensating for flicker in the generator 118 connected to the power grid 242 according to the present disclosure. As shown, the system 300 includes the turbine controller 202 communicatively coupled to a flicker compensation device 302. More specifically, as shown in FIG. 6, the controller 202 is configured to determine a nominal reactive current command 304 for the rotor 122 of the generator 118. For example, as shown, the controller 202 may receive, e.g. the grid voltage 306 and estimate the stator magnetizing current 308 via a DFIG model 310. In addition, as shown, the controller 202 may receive a reactive power setpoint 312 and determined a stator reactive current command 314 and a line bridge reactive current command 316 via a reactive power controller 318. In a first path of the controller 202, the stator magnetizing current 308 and the stator reactive current command 314 may be summed together at function block 320. The sum can then be multiplied by the DFIG turns ratio via multiplier 322 to estimate a rotor reactive feed-forward term 324.

In addition, in a second path of the controller 202, the stator reactive current command 314 may be compared to a stator reactive current feedback 326 at function block 328. The difference 330 or stator reactive current error may be fed into a stator reactive current regulator 332 as well as into the flicker compensation device 302. The output 334 of the stator reactive current regulator 332 may then be summed with the rotor reactive feed-forward term 324 via function block 336 to estimate the nominal reactive current command 304.

Still referring to FIG. 6, the flicker compensation device 302 is configured to receive measurements of one or more operational parameters of the generator 118 and/or the power grid 242. For example, as shown in FIG. 5, the operational parameter(s) may include grid voltage, generator shaft speed, stator reactive current, a stator reactive power, or any other parameters of the generator 118 and/or power grid 242. For some speed ranges, the variations in the stator reactive current may be in the frequency range detected by a flicker measurement instrument. Since the variation frequency is predictable based on the machine design (e.g. the number of poles) and the speed and grid frequency, the flicker compensation device 302 provides a regulating closed loop for specifically targeting and attenuating and/or eliminating the induced stator current variations. Thus, since the control loop is closed, it takes a very short time (e.g. less than 1 second) to compensate for flicker.

More specifically, as shown in the embodiment of FIG. 6, the flicker compensation device 302 may receive the generator speed shaft 338 and the grid voltage 306. Thus, as shown, the flicker compensation device 302 is configured to determine a flicker compensation parameter 340 as a function of the operational parameter(s). For example, in one embodiment, the flicker compensation device 302 is configured to determine a variation in the stator reactive current due to an imbalance of the rotor 122 and determine the flicker compensation parameter 340 as a function of the variation. More specifically, as shown in the illustrated embodiment, the flicker compensation device 302 may estimate a rotor speed 346 of the rotor 122 via an encoder 344 based on the measured generator shaft speed 338. Further, as shown, the flicker compensation device 302 is configured to determine a rotor position 350 of the rotor 122 by integrating the rotor speed 346 via an integrator 348.

In addition, as shown, the flicker compensation device 302 is configured to determine a grid angle 352 of the power grid 242 as a function of the grid voltage 306 of the power grid 242. For example, as shown, the flicker compensation device 302 may include a phased locked loop (PLL) 354 that is configured to receive the measured grid voltage 306. Thus, as shown, the PLL 354 processes the grid voltage 306 to estimate a grid frequency 356 of the power grid 242. The flicker compensation device 302 is then configured to integrate the grid frequency 356 via an integrator 358 to obtain the grid angle 352.

Thus, as shown at function block 360, the flicker compensation device 302 is configured to determine a slip position 362 of the rotor 122 based on the rotor position 350 and the grid angle 352, e.g. by determining the difference between the rotor position 350 and the grid angle 352. In certain embodiments, as shown, the flicker compensation device 302 may also multiply the slip position 362 by a number of poles 364 of the generator 118 via multiplier 366 to obtain a flicker position 368. As used herein, the flicker position generally refers to an angle difference between a stator flux position and the rotor position and/or the angular position of the rotor in a rotating coordinate system aligned with the stator flux.

Still referring to FIG. 6, the flicker compensation device 302 may be configured to determine the flicker compensation parameter 340 by multiplying the flicker position 368 by a sine function 370 and/or a cosine function 372 to obtain at least one first frequency output 374, 376. For example, as shown, the flicker position 368 may be multiplied by the sine function 370 and the cosine function 372 to obtain two first frequency outputs 374, 376. Further, as shown, the flicker compensation device 302 may then multiply each of first frequency outputs 374, 376 by the stator reactive current error 330 to obtain two second frequency outputs 382, 384 via respective multipliers 378, 380. The flicker compensation device 302 can then integrate each of the second frequency outputs 382, 384 via integrators 386, 388 to obtain two third frequency outputs 390, 392. Moreover, as shown, the flicker compensation device 302 may also multiply each of the third frequency outputs 390, 392 by the same sine and cosine function 370, 372 via multipliers 394, 396 to obtain respective fourth frequency outputs 397, 398. Thus, the control scheme of the flicker compensation device 302 employs the concept that if two sine waves are multiplied together, the result is two new frequencies being equal to the sum and difference of the two original frequencies. As such, only if the two original frequencies are the same does the difference frequency become a direct current (DC) signal that can be detected by an integrator. Therefore, in certain embodiments, the flicker compensation device 302 implements two sine (or cosine) multiplication functions with the detector signals 90-degrees apart to yield phase-insensitive control.

In addition, the flicker compensation device 302 may sum the fourth frequency outputs 397, 398 together at function block 399 to obtain a fifth frequency output 400 that can be used to determine the flicker compensation parameter 340. In such embodiments, as shown, the flicker compensation device 302 may also apply a gain 402 to the fifth frequency output 400 to determine the flicker compensation parameter 340.

Thus, as shown, the controller 202 may determine a net reactive current command 343 for the rotor 122 as a function of the flicker compensation parameter 340 and the nominal reactive current command 304 via function block 342. Accordingly, the controller 202 is configured to control the rotor 122 based on the net reactive current command 304 which, as explained herein, compensates for the flicker in the generator 118. Thus, the rotor-side power converter 220 supplies the varying magnetizing current to the generator 118 such that the varying magnetizing current is not taken from the grid 242.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for compensating for flicker induced by a generator connected to a power grid, the method comprising:

determining, via a controller, a nominal reactive current command for a rotor of the generator;

measuring, via at least sensor communicatively coupled to the controller, one or more operational parameters of at least one of the generator or the power grid;

determining, via a flicker compensation device, a flicker compensation parameter as a function of the one or more operational parameters;

determining, via the controller, a net reactive current command for the rotor as a function of the flicker compensation parameter and the nominal reactive current command; and, controlling, via the controller, the rotor of the generator based on the net reactive current command.

2. The method of claim 1, wherein the one or more operational parameters of at least one of the generator or the power grid comprises at least one of a grid voltage, a generator shaft speed, a stator reactive current, or a stator reactive power.

3. The method of claim 2, wherein determining, via the flicker compensation device, the flicker compensation parameter as a function of the one or more operational parameters further comprises:

determining a variation in the stator reactive current due to an imbalance or saliency of the rotor; and, determining the flicker compensation parameter as a function of the variation.

4. The method of claim 3, wherein determining the variation in the stator reactive current due to the imbalance of the rotor further comprises:

determining a rotor speed of the rotor based on the generator shaft speed;

determining a rotor position of the rotor based on the rotor speed;

determining a slip position of the rotor based on the rotor position and a grid angle of the grid voltage; and, multiplying the slip position by a number of poles of the generator to obtain a flicker position, the flicker position representing an angle difference between a stator flux position and the rotor position.

5. The method of claim 4, wherein determining the flicker compensation parameter as a function of the variation further comprises:

multiplying the flicker position by at least one of a sine function or a cosine function to obtain at least one first frequency output;

multiplying the at least one first frequency output by a stator reactive current error to obtain at least one second frequency output;

integrating the at least one second frequency output to obtain at least one third frequency output; and, multiplying the at least one third frequency output by at least one of the sine function or the cosine function to obtain at least one fourth frequency output.

6. The method of claim 4, wherein determining the flicker compensation parameter as a function of the variation further comprises:

multiplying the flicker position by a sine function and a cosine function to obtain two first frequency outputs;

multiplying each of the first frequency outputs by a stator reactive current error to obtain two second frequency outputs;

integrating each of second frequency outputs to obtain two third frequency outputs;

multiplying each of the third second frequency outputs by the sine function and the cosine function, respectively, to obtain two fourth frequency outputs; and, summing the two fourth frequency outputs together to obtain a fifth frequency output to determine the flicker compensation parameter.

7. The method of claim 6, further comprising applying a gain to the fifth frequency output to determine the flicker compensation parameter.

8. The method of claim 4, further comprising determining the grid angle as a function of the grid voltage.

9. The method of claim 8, wherein determining the grid angle as a function of the grid voltage further comprises:

determining a grid frequency by processing the grid voltage via a phase locked loop; and, integrating the grid frequency to obtain the grid angle.

10. An electrical power system connected to a power grid, comprising:

a generator comprising a rotor and a stator;

at least one sensor for monitoring one or more operational parameters of at least one of the generator or the power grid; and, a controller configured to control the electrical power system, the controller configured to perform one or more operations, the one or more operations comprising:

determining a nominal reactive current command for the rotor;

determining a flicker compensation parameter as a function of the one or more operational parameters;

determining a net reactive current command for the rotor as a function of the flicker compensation parameter and the nominal reactive current command; and, controlling the rotor of the generator based on the net reactive current command.

11. The electrical power system of claim 10, wherein the one or more operational parameters of at least one of the generator or the power grid comprises at least one of a grid voltage, a generator shaft speed, a stator reactive current, or a stator reactive power.

12. The electrical power system of claim 11, wherein determining, via the flicker compensation device, the flicker compensation parameter as a function of the one or more operational parameters further comprises:

determining a variation in the stator reactive current due to an imbalance or saliency of the rotor; and, determining the flicker compensation parameter as a function of the variation.

13. The electrical power system of claim 12, wherein determining the variation in the stator reactive current due to the imbalance of the rotor further comprises:

determining a rotor speed of the rotor based on the generator shaft speed;

determining a rotor position of the rotor based on the rotor speed;

determining a slip position of the rotor based on the rotor position and a grid angle of the grid voltage; and, multiplying the slip position by a number of poles of the generator to obtain the flicker position.

14. The electrical power system of claim 12, wherein determining the flicker compensation parameter as a function of the variation further comprises:

multiplying the flicker position by at least one of a sine function or a cosine function to obtain at least one first frequency output;

multiplying the at least one first frequency output by a stator reactive current error to obtain at least one second frequency output;

integrating the at least one second frequency output to obtain at least one third frequency output; and, multiplying the at least one third frequency output by at least one of the sine function or the cosine function to obtain at least one fourth frequency output.

15. The electrical power system of claim 12, wherein determining the flicker compensation parameter as a function of the variation further comprises:

multiplying the flicker position by a sine function and a cosine function to obtain two first frequency outputs;

multiplying each of the first frequency outputs by a stator reactive current error to obtain two second frequency outputs;

integrating each of second frequency outputs to obtain two third frequency outputs;

multiplying each of the third second frequency outputs by the sine function and the cosine function, respectively, to obtain two fourth frequency outputs; and, summing the two fourth frequency outputs together to obtain a fifth frequency output to determine the flicker compensation parameter.

16. The electrical power system of claim 15, further comprising applying a gain to the fifth frequency output to determine the flicker compensation parameter.

17. The electrical power system of claim 12, further comprising determining the grid angle as a function of the grid voltage.

18. The electrical power system of claim 17, wherein determining the grid angle as a function of the grid voltage further comprises:

determining a grid frequency by processing the grid voltage via a phase locked loop; and, integrating the grid frequency to obtain the grid angle.

19. The electrical power system of claim 10, wherein the generator comprises a doubly-fed induction generator (DFIG), wherein the DFIG is part of a wind turbine power system.

20. A method for determining whether generator-induced flicker is present during operation of a generator of a wind turbine connected to a power grid, the method comprising:

measuring, via at least sensor, a plurality of operational parameters of at least one of the generator or the power grid, the plurality of operational parameters comprising, at least, a grid voltage of the power grid and shaft speed of the generator;

determining, via a flicker compensation device communicatively coupled to a controller of the wind turbine, a flicker compensation parameter as a function of the plurality of operational parameters; and, determining whether flicker is present during operation of the generator based on the flicker compensation parameter.

* * * * *